United States Patent [19]
Hunter et al.

[11] Patent Number: 4,989,636
[45] Date of Patent: Feb. 5, 1991

[54] COUPLING FOR PRESSURE OF VACUUM FLUID SYSTEM

[75] Inventors: George S. Hunter, Richmond; Michael J. Hawker, Hadleigh, both of Great Britain

[73] Assignee: Process Scientific Innovations Limited, Durham, Great Britain

[21] Appl. No.: 382,692

[22] PCT Filed: Feb. 11, 1988

[86] PCT No.: PCT/GB88/00083
§ 371 Date: Oct. 13, 1989
§ 102(e) Date: Oct. 13, 1989

[87] PCT Pub. No.: WO88/06059
PCT Pub. Date: Aug. 25, 1988

[30] Foreign Application Priority Data
Feb. 13, 1987 [GB] United Kingdom ............... 8703313

[51] Int. Cl.⁵ .................. F16K 37/00; B01D 46/42
[52] U.S. Cl. .................... 137/557; 285/924; 210/232; 210/DIG. 17
[58] Field of Search ............. 137/557; 285/87, 93, 285/320, 924; 210/142, 232, 238, 436, 440, 443, 444, DIG. 17

[56] References Cited
U.S. PATENT DOCUMENTS

| | | | |
|---|---|---|---|
| 3,124,157 | 3/1964 | Krzewina | 285/924 X |
| 3,179,444 | 4/1965 | Lansky et al. | 285/87 |
| 4,126,558 | 11/1978 | Luceyk | 210/436 X |
| 4,422,675 | 12/1983 | Norris et al. | 285/93 X |
| 4,678,572 | 7/1987 | Hehl | 210/436 X |

FOREIGN PATENT DOCUMENTS
0198454 10/1966 European Pat. Off. .
2107086 5/1972 France .

Primary Examiner—John Rivell
Attorney, Agent, or Firm—Oblon, Spivak, McClelland, Maier & Neustadt

[57] ABSTRACT

A coupling for a pressure or vacuum fluid system having a bowl and filter head (10, 26) that connect together by relative rotation to engage bayonet coupling formations (32, 34, 94) thereof. When connected together the bowl (10) and filter head (26) have outer walls (16, 104) overlapping with an intervening seal (22) therebetween. A pressure relief valve (38) is provided in one of the members (10). A latch (36, 108) engages at an angular position of said members (10, 26) where the bayonet coupling is established to prevent relative rotation of said members (10, 26) and is prevented from engagement at other angular positions. The latch (36) is decoupled from the valve (38) when in its engaged state but is operatively coupled to the valve (38) when in a disengaged state to open said valve (38), fluid flow therethrough providing an audible warning when a pressure differential exists across the valve (38).

14 Claims, 7 Drawing Sheets

COUPLING FOR PRESSURE OF VACUUM FLUID SYSTEM

TECHNICAL FIELD

This invention relates to a coupling for a pressure or vacuum fluid system and more particularly though not exclusively to a fitting for mounting a filter bowl to a filter housing head of a compressed air filter.

BACKGROUND ART

A coupling having separate plastics bowls and bowl guards, in which the bowl guard is attached to a header by a bayonet fitting controlled by a locking pin is described in patent specification No. GB-A-2052297 (Wilkerson Corporation)

DISCLOSURE OF THE INVENTION

This invention is based on the realization that by using a pivoted locking member rather than a sliding locking member as in the Wilkerson coupling, an operable interconnection can be established between the locking member and a pressure relief valve in the filter bowl so that when the locking member is displaced from its locking position and a pressure differential exists across the valve an audible hiss of gas flow through the valve is apparent.

Broadly stated the invention provides a coupling for a pressure or vacuum fluid system comprising:

first and second members that connect together by relative rotation to engage bayonet coupling means thereof and when connected together have outer walls overlapping with an intervening seal therebetween;

a pressure relief valve in one of the members;

latch means that engages at an angular position of said members where the bayonet coupling is established to prevent relative rotation of said members and that is prevented from engagement at other angular positions, the latch means being decoupled from the valve when in its engaged state but being operatively coupled to the valve when in a disengaged state to open said valve, fluid flow therethrough providing an audible warning when a pressure differential exists across the valve.

More specifically the invention provides a coupling for a pressure or vacuum fluid system comprising first and second members arranged to interfit by a bayonet coupling to bring outer walls into overlapping engagement with an intervening seal therebetween, the first member having a pressure relief valve coupled to a latch that fits into a catch recess in the second member when the bayonet coupling is in its engaged state, the arrangement being such that when the latch is other than home in the catch recess the pressure relief valve is open and fluid flow therethrough provides an audible warning when a pressure differential exists across the valve.

BRIEF DESCRIPTION OF THE DRAWINGS

Various embodiments of the invention will now be described, by way of example only, with reference to the accompanying drawings, in which corresponding parts are identified by the same reference numerals, and.

BEST MODE FOR CARRING OUT THE INVENTION

In FIGS. 1-4 of the drawings a filter bowl 10 houses a filter element 12 or an activated carbon adsorbtion element or a combined filter and adsorption element which is supported at its lower end on a shoulder (not shown) within the bowl 10. The mouth of the bowl 10 is formed with a transition region 14 leading to a radially enlarged region 16. The outer face of region 16 is formed with a vertical shoulder 18 above which is a groove 20 in which an O-ring 22 fits, the upper end of groove 20 being bounded by a containment rib 24 which prevents the O-ring from being displaced as the bowl 10 is demounted from its filter housing head 26. Internally the mouth of bowl 10 has at transition region 14 a horizontal shoulder 28. On the shoulder 28 are formed four vertical horizontally interrupted buttresses 30 disposed at 90 degree intervals about the axis of bowl 10. Each buttress 30 is formed as a lower part 32 that grows out of the shoulder 28 and acts as a physical stop and an upper part 34 that acts as a bayonet ramp follower with an intervening groove 35, the grooves 35 being of the same height, having a common datum and being directed parallel to the shoulder 28. Each buttress 30 has a relatively small angular extent (about 24°), the corresponding intervals being relatively large (about 66°), these intervals not being critical but being selected to provide an effective and robust interface.

The mouth of bowl 10 is provided at one angular position with a pivoted locking lever or handle generally indicated by reference numeral 36 and a pressure relief valve generally indicated by reference numeral 38. The lever 36 is generally rectangular when viewed from the outside and fits into a corresponding recess in the region 16 defined between the outer surface 40 and a relieved surface 42. The recess is deepened partway down at line 44 and leads to a cut-out 46 of small angular extent in the transition region 14.

The valve 38 comprises a mushroom headed pintle 48 that is urged by wire torsion spring 50 against an elastomeric sealing washer 52 on a flat internal bearing surface 54 of the bowl 10 with a slotted or grooved pintle portion 56 projecting through hole 58 in the bowl 10 with a substantial length as shown projecting into the cut-out 46. The lever 36 when viewed in profile has a chamfered inner top face 60 that in mounting of the bowl 10 to the head 26 throws the lever 36 outwardly through a maximum displacement of 22° from its normal vertical position. The face 60 leads to a vertical control face 62 that butts against the surface 42 to define the normal position. Below face 60 a spindle 64 passes through ears 66 and a central rib 68 that extends below spindle 64 to the lower edge of the lever 36 where it registers with pintle portion 56. The spindle 64 is trapped in lateral extensions 69 of the recess and a coiled torsion spring 70 on the spindle 64 urges the lever 36 to pivot to its normal upright position. A gap exists in the upright position between the bullnose tip of pintle 56 and the rib 68 on the rear face of the lever 36 with the lever 36 decoupled from the pintle 56. As the lever 36 is depressed by finger pressure on its lower portion against the action of spring 70, the rib 68 encounters the pintle 56 which it causes to move inwards against the action of the spring 50, thereby opening the pressure relief valve 38. It will be understood that unless the lever 36 is substantially vertical with the limits set by the gap between rib 68 and pintle 56 the valve 38 is open.

Figure 1:
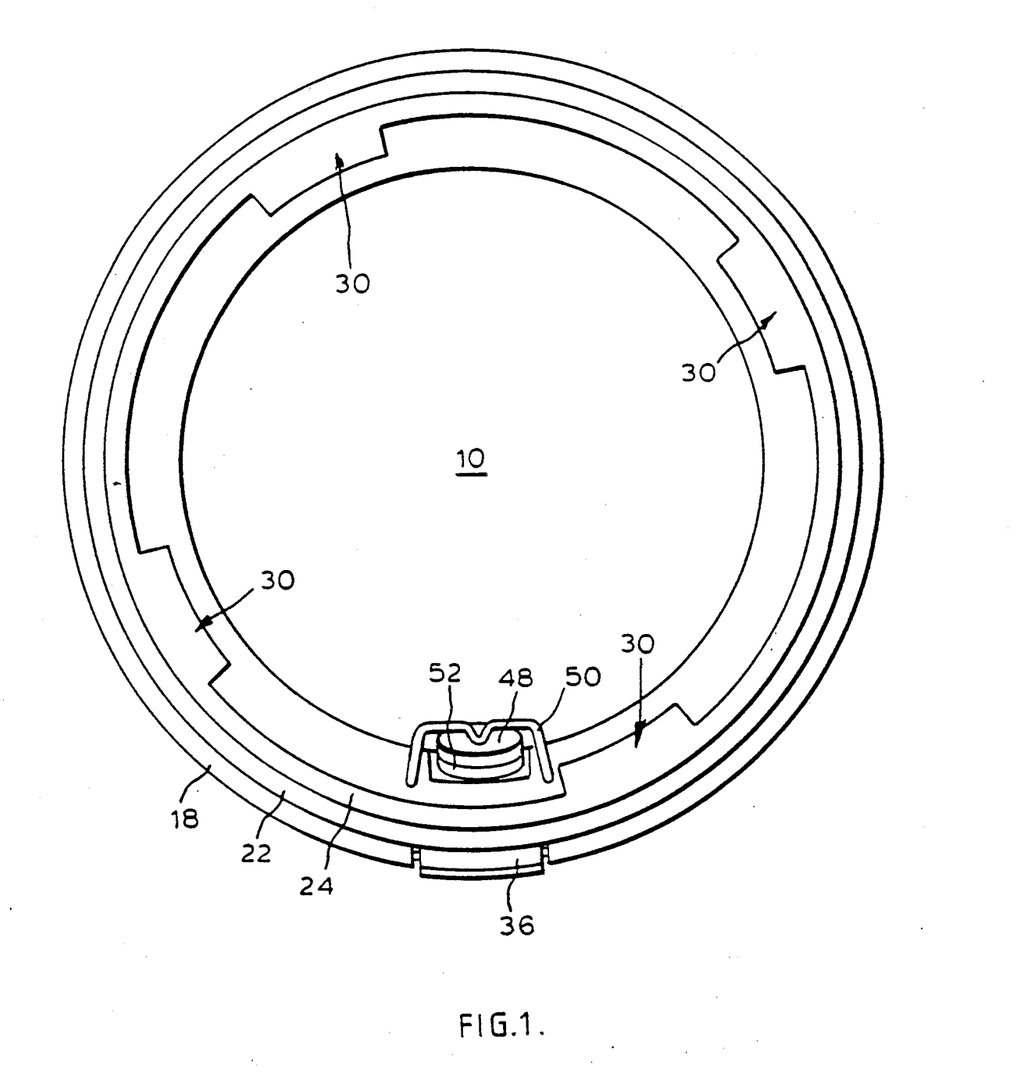
FIGS. 1 and 2 are top plan and underneath bottom views, respectively of a filter bowl.
Figure 2:
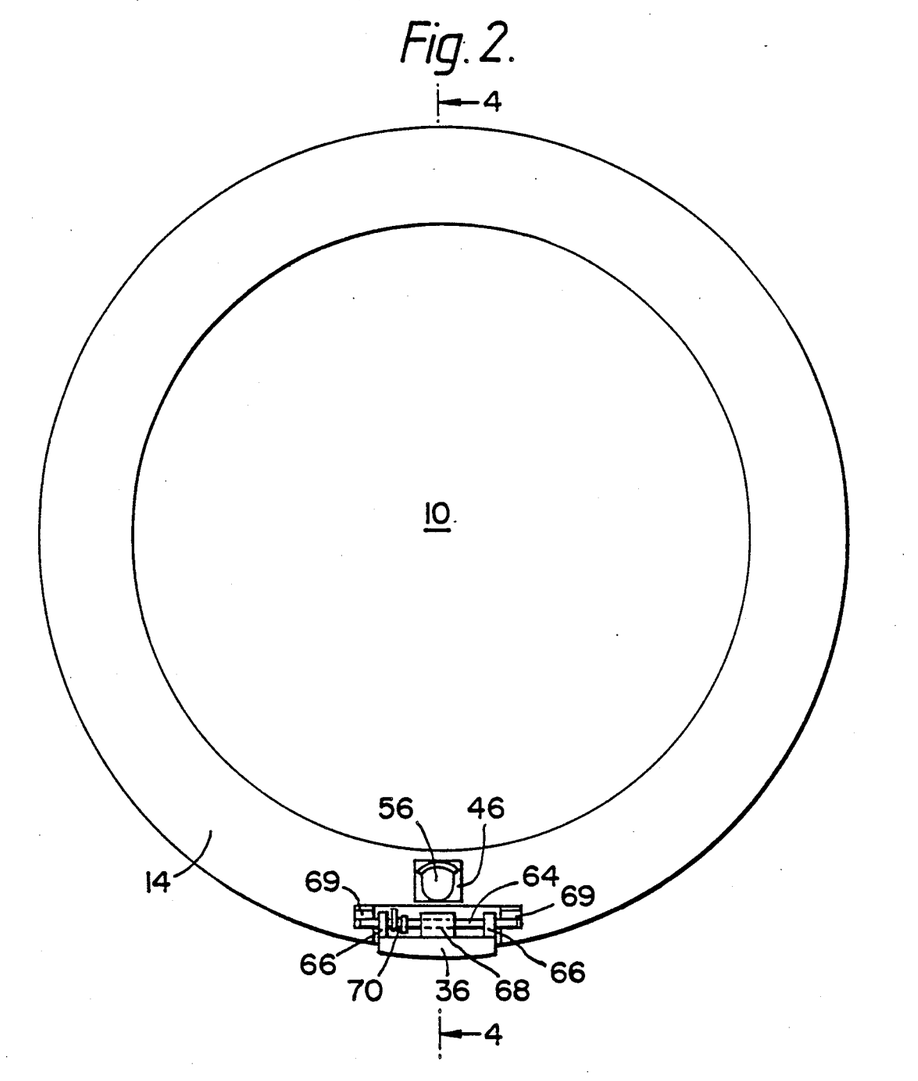
Figure 3:
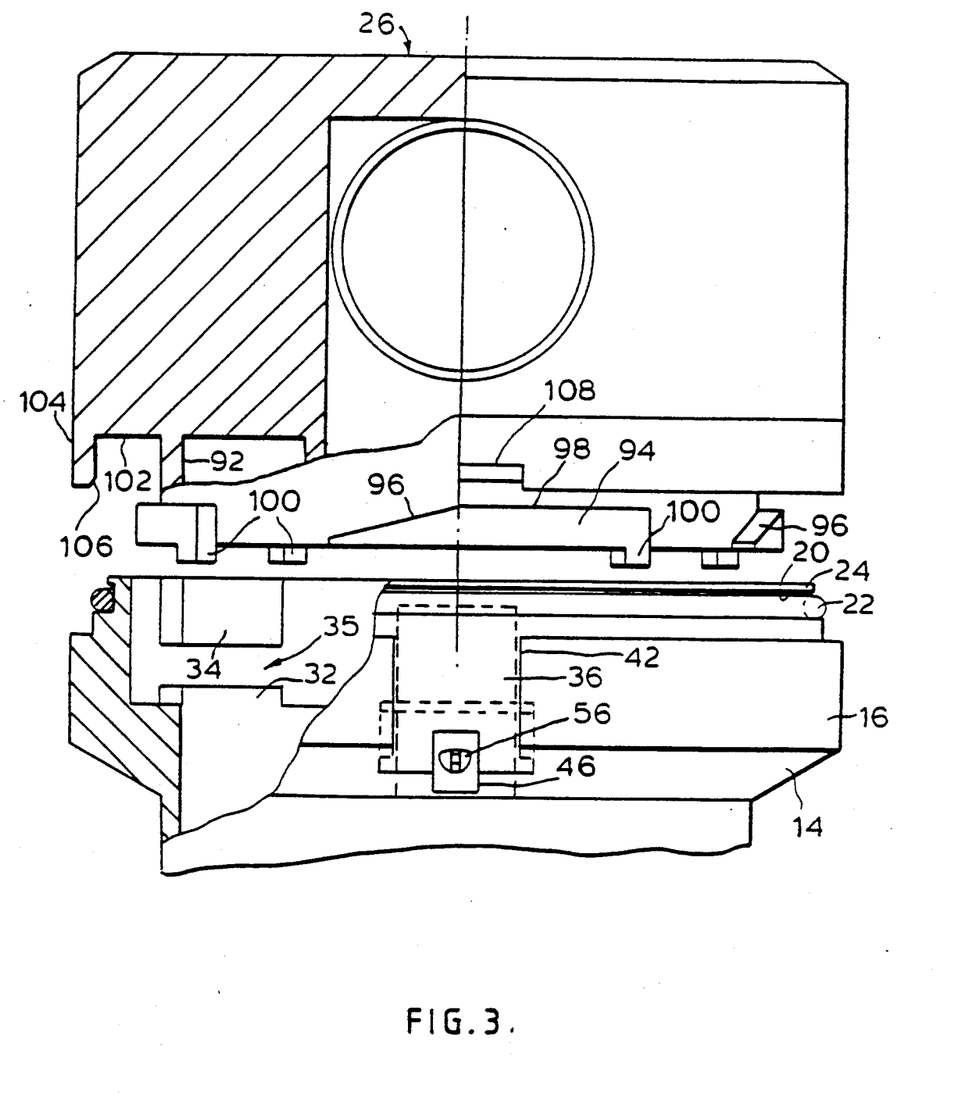
FIG. 3 is a fragmentary view of a head and the upper part of a filter bowl partly in section to reveal hidden details.
Figure 4:
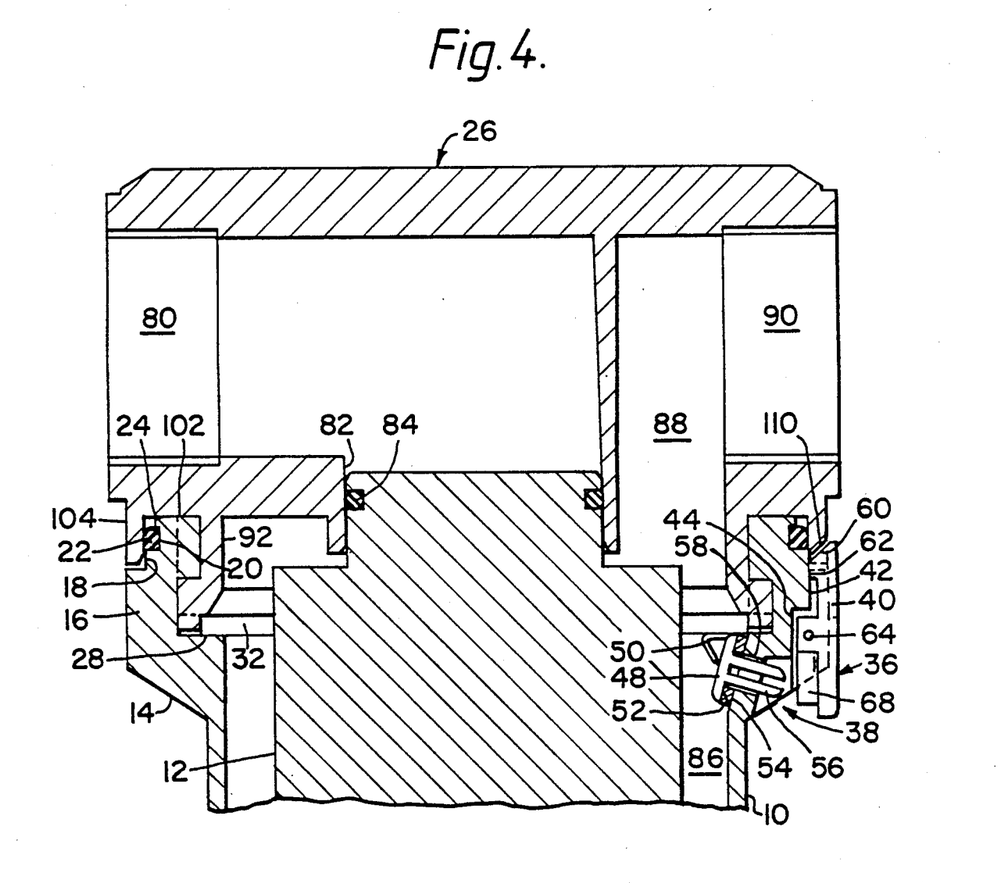
FIG. 4 is a section of the bowl and head on the line A—A of FIG. 2.
Figure 5:
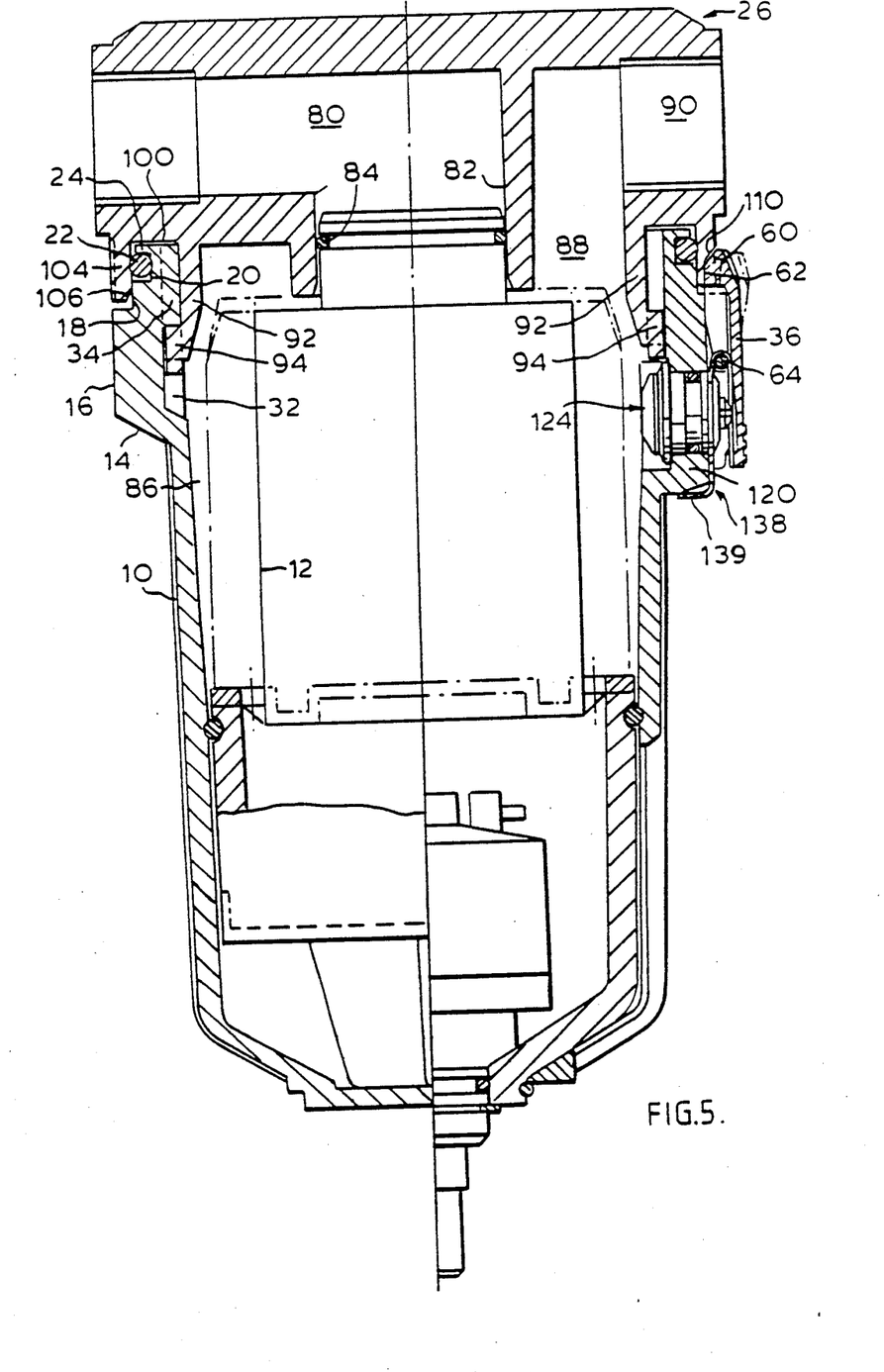
FIG. 5 is a view in vertical section of a second form of the filter bowl and head.

Referring now to the structure of the filter housing head 26 there is shown a first threaded or bayoneted port 80 leading to the interior of the filter element 12 via a vertical port 82 to which the element 12 seals by means of O-ring 84 as is conventional in the art. The outer chamber 86 defined between the filter 12 and the bowl 10 leads via a radially offset vertical port 88 in the head 26 to a second threaded or bayonet port 90, the ports 80, 90 being interchangeably inlets and outlets to the filter 12 depending upon the intended direction of flow. About the port 82 at an intermediate radial position in the underside of the head 26 is formed a depending cylindrical wall 92 having at its lower edge radially projecting bayonet locking elements 94 in its outer face each complementary to the buttresses 30 and each formed with a lead-in ramp 96 along its top edge leading to a horizontal region 98 and further each having at its end opposite to ramp 96 a depending tooth 100. Externally of the wall 92 a solid annular underface 102 of the head 26 leads to an outer cylindrical wall 104 a lower portion of whose inner face is formed with a lead-in portion 106 inclined at 20° to vertical as shown. Four cut-outs 108 spaced 90 degrees apart are provided in the wall 104 and conform in width and profile to the top of lever 36 as shown, being slightly oversized to avoid an interference fit. A surface 110 of the cut-out which faces the surface 60 of the lever 36 is spaced slightly therefrom in the normal upright position of lever 36 to allow for manufacturing tolerances and ensure that the gap between rib 68 and pintle 56 is present when surface 62 bears against vertical surface 42 irrespective of manufacturing tolerances and built-in "float" between the head 26 and bowl 10. Such float occurs because of a slight clearance between bayonet elements 94 and portions 32, 34 of the buttresses 30. The number of cut-outs can be one, two, three or more than four as required.

For assembly of the bowl 10 to the head 26, the bowl 10 is offered up at a position angularly offset from the working position and defined by sight marks so that the buttresses 30 enter the gaps between the bayonet ramps 96, after which the bowl 10 is rotated to engage the bayonet elements 94 into the grooves 35. The upper parts 34 ride up the ramps 96 onto the horizontal parts 98 and travel is limited by abutment of the teeth 100 with the lower parts 32. As the bowl 10 is offered up the O-ring 22 seals against the inner face of wall 104 into which it is guided by lead-in surface 106. It will be noted that when the bowl 10 is assembled, the wall 104 overlaps shoulder 18 throughout its periphery and that a small overlap is maintained even in the regions of the cut-outs 108. The O-ring 22 always has an outer bearing surface and there is always an overlap preventing the O-ring from being extruded from between the bowl 10 and the filter head 26. As the bowl 10 is offered up, the lever 36 is tripped outwards as it encounters the wall 104 and remains in its outwardly inclined state until it snaps home in the recess 108. Thus the valve 38 is open until the lever 36 has snapped home. Correspondingly, when it is desired to remove the bowl 10, the first action is to depress the lower part of lever 36 by finger or thumb pressure, thereby opening valve 38 and depressurizing the bowl 10. Even under slight internal pressure, gas escaping through the valve 38 gives rise to a clearly audible hiss, and the valve 38 remains open with continuing hissing of any escaping gas until the bowl is removed. Accordingly there is a warning given avoid accidental removal of the bowl 10 when under pressure.

An advantage of the above arrangement is that the shallow lead-in ramp 96 provides a low torque connection between the bowl 10 and the head 26, requiring only a quarter turn to lock and unlock. The lever 36 provides a positive mechanical lock between bowl 10 and head 26. The lever 36 automatically pivots outwardly when the bowl 10 is offered to head 26 and automatically opens the pressure relief valve 38, and the valve 38 will continue to operate until lever 36 is located into recess 108. The housing 26 cannot be pressurised until the bowl 10 is securely locked to head 26, and during removal, operating the lever 36 automatically opens relief valve 38 and vents the housing 26 to atmosphere. The piston seal configuration of O-ring 22 between head 26 and bowl 10 provides excellent long-term performance at a high operating pressure and standard O-rings can be used.

Various modifications may, of course be made to the embodiment described without departing from the invention. For example, the invention is not limited to the coupling of a filter bowl to a filter housing and could be used to connect lengths of pipe together with the lever 36 and valve 38 being built into a floating ring fitted on one of the pipes to be joined that cooperates with bayonet elements 94 and a wall 104 on the other pipe. The invention is applicable through a wide range of different sizes; the ability to alter the width of the lever 36 provides for a coding system against accidental connection of the wrong parts so that e.g. an oxygen line could not be confused with a nitrous oxide line in an anaesthetic apparatus; this could be further reinforced if needed by adjusting the shape of lever 36 to provide further key details.

Figure 6:
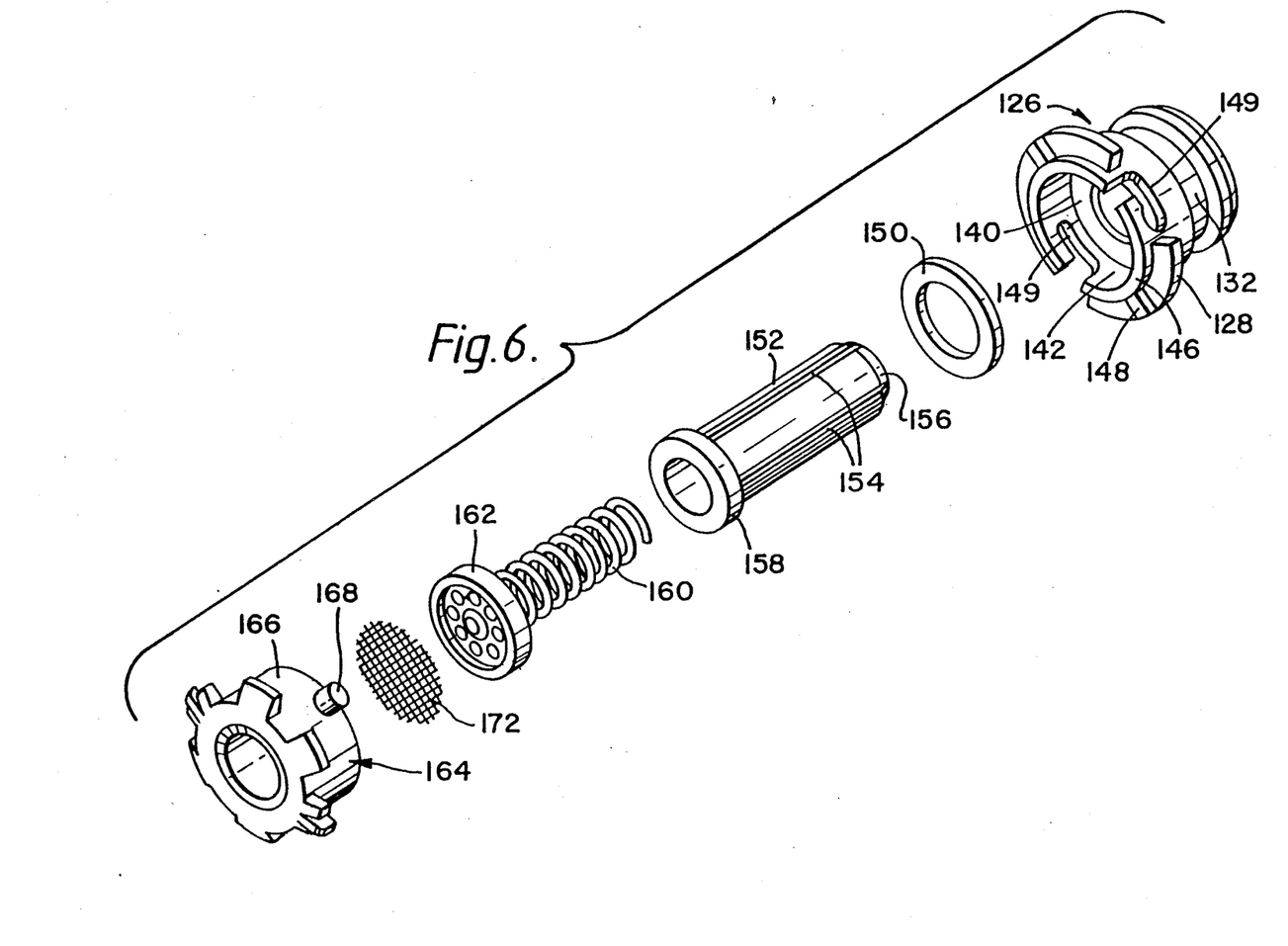
FIG. 6 is an exploded view of a valve that fits into the filter bowl of FIG. 5.
Figure 7:
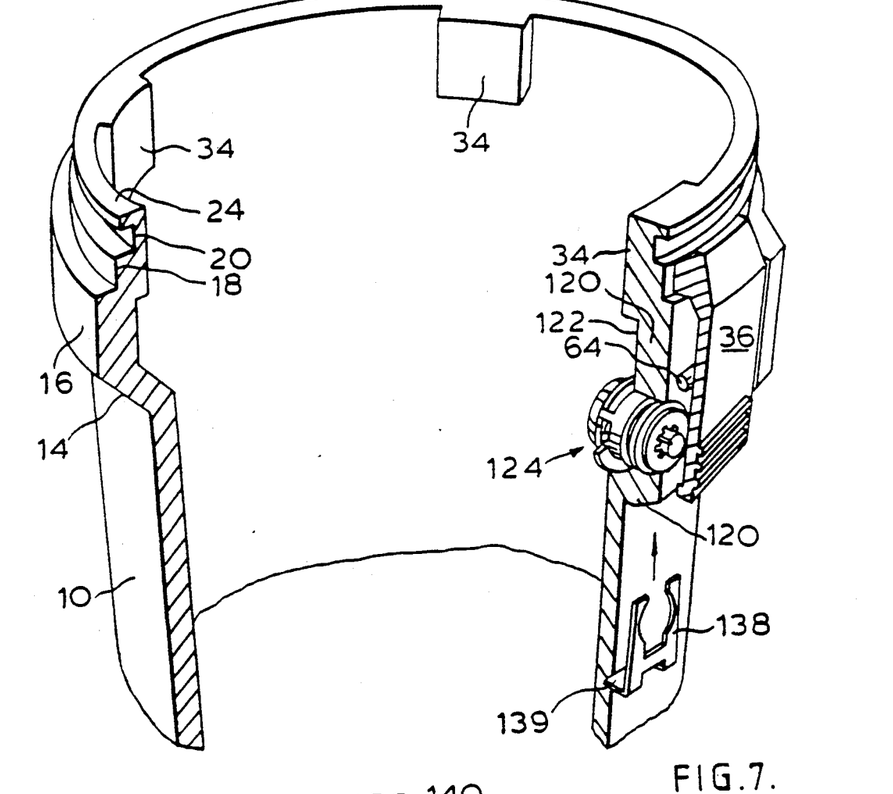
FIG. 7 is a perspective cut-away view of the upper part of the bowl of FIG. 5.
Figure 8:
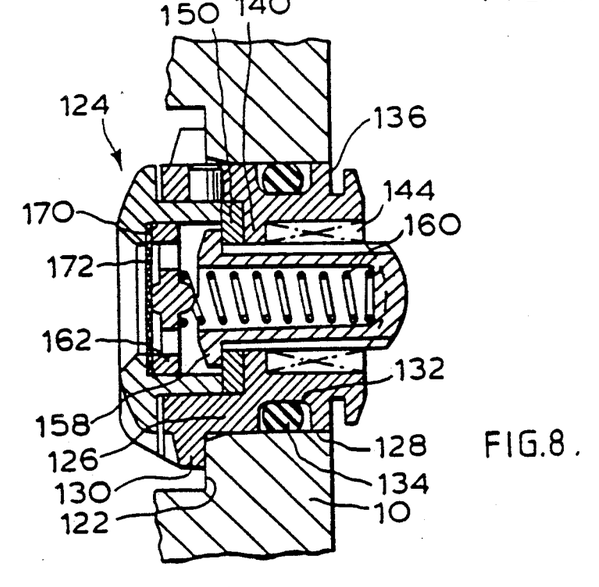
FIG. 8 is a sectional view of part of the filter bowl showing the valve also in section.

A second form of the coupling is shown in FIGS. 5 to 8. The filter bowl 10 is formed with a protuberance 120 having a relieved inner face 122 that enables a pressure relief valve assembly 124 to be fitted without the assembly 124 protruding into the outer chamber 86. As shown in FIGS. 6 and 8, a valve body 126 fits into a hole 128 through the bowl 10. The inner end of the body 126 is formed with a flange 130 that abuts the inner face 122. Its midregion is formed with a groove 132 for receiving an O-ring 134 that seals fluid-tightly against the hole 128. Its outer end is formed with a second groove 136. A generally C-shaped circlip 138 (FIG. 7) is slideable upwards over the outer face of the protuberance 120 to snap into the groove 136 and thereby retain the valve body in the bowl 10. The circlip has an inturned tongue 139 that abuts the lower edge of protuberance 120 and provides a means by which the circlip 138 can be removed for valve replacement. Internally of the body 126, a flange 140 separates a relatively large inner bore 142 from a smaller splined counterbore 144. The inner face of the body 126 has an upstanding collar 146 on the exterior of which occur a pair of diametrically opposed radial wings 148. A pair of bayonet slots 149 lead from the inner end of the body 126. An annular valve seal 150 of a rubber or the like sits against the flange 140 to define a valve seat.

A pintle 152 is generally thimble shaped and is slidingly fits in the counterbore 144. It has axial guide ribs 154 at an angular spacing equal to a multiple of the angular spacing of the splines of counterbore 144 so that the ribs 154 interfit with some only of the splines to provide guidance and an anti-rotational characteristic combined with free air passages along the vacant splines. In the closed valve position the head 156 of the pintle 152 protrudes outwardly of the valve body 126 and an outturned flange 158 at its base seats on the seal 150. The pintle 152 is biased towards the valve closed position by means of a coil spring 160 which is held in compression by a foraminous retaining disc 162. An annular cap 164 has a sleeve part 166 that fits into the inner bore 142 and is formed with bayonet pins 168 that are engageable with the sockets 149. The interior of the cap 164 is stepped at 170 to provide an abutment for the retaining disc 162. A mesh filter 172 fits between the retaining disc 162 and the cap 164 and guards against particles or droplets of contaminant entering the outer chamber 86 in the event of reverse flow through the valve. The arrangement described above has the advantage that the valve is a separately manufactured and is a replaceable subassembly whose parts, other than spring 160, can be moulded in a plastics material.

Obviously, numerous modifications and variations of the present invention are possible in light of the above teachings. It is therefore to be understood that within the scope of the appended claims, the invention may be practiced otherwise than as specifically described herein.

We claim:

1. A coupling for a pressure or vacuum fluid system comprising:
   first and second members that connect together by relative rotation to engage bayonet coupling means thereof and when connected together have outer walls overlapping with an intervening seal therebetween;
   a pressure relief valve in one of the members; and
   latch means that engages at an angular position of said members where the bayonet coupling is established to prevent relative rotation of said members and that is prevented from engagement at other angular positions, the latch means being decoupled from the valve when in its engaged state but being operatively coupled to the valve when in a disengaged state to open said valve, fluid flow therethrough providing an audible warning when a pressure differential exists across the valve.

2. A coupling according to claim 1, wherein the first member has the pressure relief valve which is coupled to the latch means which fits into a catch recess in the second member when the bayonet coupling is established, the second member having a plurality of male bayonet projections that fit between pairs of axially spaced inwardly projecting socket defining formations of the first member, and teeth depending from the projections cooperating with said socket-defining formations when said first and second members are fitted together to limit relative angular movement thereof.

3. A coupling according to claim 2, wherein said socket-defining formations also cooperate with guide ramps on the bayonet projections for urging the members axially together as the members are relatively rotated to their coupled position, the ramps leading to level faces of the bayonet projections defining an intended axial relative position of the first and second members.

4. A coupling according to claim 1 wherein said plurality of bayonet projections in the second member comprise four angularly spaced bayonet projections that fit between respective ones of four pairs of formations on the first member.

5. A coupling according to claim 1 wherein: the pressure relief valve is operated by a pintle;
   a stem on said pintle projects a distance through a hole in the first member and includes one of ribbed, grooved or slotted members so as to be slideably supported in one of the first member and the valve body and to define air passages therewith; and
   the latch comprises a rocking lever pivoted to the first member with a head to one end of the lever that fits into a recess in the second member and with a basal portion to the opposite end of the lever that engages the stem of said pintle to open said valve.

6. A coupling according to claim 5, wherein a clearance is formed between the stem of the pintle and the basal portion of the lever when its latch head is in the recess in the second member.

7. A coupling according to claim 6 which comprises first resilient means located in one of the first member and the valve body which urges the pintle to a valve closure position and second resilient means on a spindle of said lever which urges the lever to a latching attitude.

8. A coupling as claimed in claim 7, wherein the pintle and valve body form parts of a valve sub-assembly that fits as a unit into a protuberance of the first member, said sub-assembly including filter means for filtering fluid flowing through said valve.

9. A coupling according to claim 6, wherein the head of the lever has an inclined inner face that cooperates with the outer wall of the second member as the first and second members are offered together to cam the lever from a latching attitude.

10. A coupling according to claim 1 wherein the first element is a filter bowl and the second element is a filter housing head.

11. A coupling as set forth in claim 5, wherein a head on said pintle closes on a seat in the interior of the first member.

12. A coupling as set forth in claim 5, wherein a head on said pintle closing in a valve body captive in the first member.

13. A coupling according to claims 11 or 12, wherein said pintle comprises a flanged pintle.

14. A coupling according to claims 11 or 12, wherein said pintle comprises a mushroom-headed pintle.

* * * * *